UNITED STATES PATENT OFFICE.

ARTHUR HEINEMANN, OF WEST KENSINGTON, LONDON, ENGLAND.

PRODUCTION OF PROPYLENE FROM ACETYLENE AND METHANE.

1,202,385. Specification of Letters Patent. Patented Oct. 24, 1916.

No Drawing. Original application filed May 27, 1913, Serial No. 770,221. Patent No. 1,134,677, dated April 6, 1915. Divided and this application filed March 16, 1915. Serial No. 14,871.

*To all whom it may concern:*

Be it known that I, ARTHUR HEINEMANN, a subject of the King of Prussia, residing at 223 North End road, West Kensington, London, W., England, have invented new and useful Improvements Relating to the Production of Propylene from Acetylene and Methane, of which the following is a specification.

This invention relates to the production of propylene by the union of acetylene and methane, and consists of a modification of the process described in the specification of my application for Letters Patent of the United States Serial No. 770,221 (Patent No. 1,134,677). According to the process described in said patent the union of the acetylene and methane was effected in the presence of an intimate mixture or association of catalytic metals of common occurrence, such, for instance, as metals of the iron group, such as iron or nickel, or metals of the copper group, such as copper or silver, and noble metals of the platinum class, such for instance, as platinum, iridium and palladium. In the embodiment of the process described in said patent the reaction space of the tube or vessel containing the intimate mixture or association of different catalytic metals was heated, and this heating was effected either by the application of heat to the exterior of the reaction tube or vessel or by passing a current of electricity through heating coils located within the tube or vessel.

According to the present invention, instead of using heat as aforesaid, the union of the acetylene and methane in the presence of said intimate mixture or association of different catalytic metals is effected through the agency of actinic or chemically active rays. These actinic or chemically active rays may consist of violet or ultra-violet rays or of silent electric discharges.

A compound catalyst made according to the manner described in my Patent No. 1,134,677 and containing a mixture of catalytic or contact metals permits of a reduction in the temperature at which the union of the acetylene and methane takes place and of the technical production of propylene by the union of acetylene and methane. Such a compound contact body may be prepared in the following manner:—One of said contact metals, for example copper, is deposited in a porous body, for example pumice stone, either electrolytically or by the reduction of a copper salt. The pumice stone or the like provided with a coating of copper or having its pores partly filled with copper is then dipped in a solution of a salt of a contact metal of the platinum class, for instance a chlorid of platinum, and is dried. The salt is then, if necessary, reduced. In this way there is obtained a contact body consisting of two metals which exert a mutual balancing effect on one another, the more active property of the platinum group metal being mitigated by the less active property of the other metal associated therewith, and allowing the desired reaction to take place at a moderate temperature. Such other contact metals can also be used in a finely divided state or in strip form, as for example copper gauze, copper wool, aluminium turnings or magnesium strips. Such bodies are then prepared by dipping in a solution of a salt of a platinum group metal, such for example as a chlorid of platinum or palladium. The platinum group metal is then deposited by electrolytic action. Care must however be taken to immediately wash and dry the contact bodies so prepared in order to avoid destruction of the common metals of said contact bodies. In the use of such a compound catalyst in the present invention a mixture of equal volumes of acetylene and methane is passed into a reaction tube or vessel containing said intimate mixture or association of catalysts. During the passage of the mixture through said tube or vessel the reaction space thereof is subjected to the influence of said actinic or chemically active rays. When violet or ultra-violet rays are used a suitable number of mercury lamps are supported in close proximity to the reaction tube or vessel containing the intimate mixture or association of different catalytic metals. When however silent electric discharges are used the apparatus by which the silent electric discharges is produced are connected to terminals located at suitable points in the reaction tube or vessel.

Having now described my invention what I have invented and desire to secure by Letters Patent of the United States is as follows:—

1. The process of making propylene which comprises exposing a mixture of methane and acetylene to the action of chemically active rays in the presence of a catalyst.

2. The process of making propylene which comprises exposing a mixture of methane and acetylene to the action of chemically active rays in the presence of a catalyst comprising a platinum group metal and another metal.

3. The process of making propylene which comprises passing a current of a mixture of methane and acetylene through a suitable reaction chamber containing a compound catalyst comprising a platinum group metal and another metal and during such passage exposing the mixture to the action of chemically active rays.

In testimony whereof I have signed my name to this specification, in the presence of two subscribing witnesses.

ARTHUR HEINEMANN.

Witnesses:
OSCAR A. HEINEMANN,
ERNEST HARKER.